(12) United States Patent
Hyll et al.

(10) Patent No.: US 8,848,844 B2
(45) Date of Patent: Sep. 30, 2014

(54) RECEIVER NODE AND A METHOD THEREIN FOR COMPENSATING FREQUENCY OFFSET

(75) Inventors: Mattias Hyll, Vendelsö (SE); Fredrik Huss, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/820,814

(22) PCT Filed: Sep. 17, 2010

(86) PCT No.: PCT/SE2010/051000
§ 371 (c)(1),
(2), (4) Date: Mar. 5, 2013

(87) PCT Pub. No.: WO2012/036605
PCT Pub. Date: Mar. 22, 2012

(65) Prior Publication Data
US 2013/0170590 A1  Jul. 4, 2013

(51) Int. Cl.
*H04L 27/06* (2006.01)
*H04L 27/00* (2006.01)
*H04L 25/02* (2006.01)

(52) U.S. Cl.
CPC ........ *H04L 25/0206* (2013.01); *H04L 27/0014* (2013.01); *H04L 2027/0065* (2013.01); *H04L 2027/0087* (2013.01)
USPC .......................................................... 375/343

(58) Field of Classification Search
CPC ............ H04L 27/0014; H04L 25/0206; H04L 2027/0087; H04L 2027/0065
USPC .......................................................... 375/343
See application file for complete search history.

(56) References Cited

U.S. PATENT DOCUMENTS 5,343,498 A * 8/1994 Toy et al. ....................... 375/259
6,704,374 B1 * 3/2004 Belotserkovsky et al. ... 375/326

(Continued)

FOREIGN PATENT DOCUMENTS

| EP | 2182690 A1 | 5/2010 |
| WO | 2008115380 A1 | 9/2008 |
| WO | 2010099808 A1 | 9/2010 |

OTHER PUBLICATIONS

3rd Generation Partership Project, "3rd Generation Partnership Project; Technical Specification Group Radio Access Network; Evolved Universal Terrestrial Radio Access (E-UTRA); Base Station (BS) radio transmission and reception (Release 8)", Technical Specification, 3GPP TS 36.104 V8.10.0, Jun. 1, 2010, pp. 1-74, 3GPP, France.

(Continued)

*Primary Examiner* — Juan A Torres
(74) *Attorney, Agent, or Firm* — Coats & Bennett, PLLC

(57) ABSTRACT

According to embodiments herein an ambiguity problem when compensating for frequency offset may be solved by compensating a received reference symbol according to two different frequency offset hypotheses; the estimated frequency offset and the a mirrored version of the same. Then by comparing the compensated reference symbol of the different frequency hypotheses with a target reference symbol, which is known at the receiver node 12, the frequency offset hypothesis which is most likely is used to compensate a received data symbol.

11 Claims, 10 Drawing Sheets

(56) References Cited

U.S. PATENT DOCUMENTS

| | | | |
|---|---|---|---|
| 7,012,881 B2 * | 3/2006 | Kim | 370/208 |
| 7,039,131 B2 * | 5/2006 | Banerjea | 375/326 |
| 7,072,783 B2 * | 7/2006 | Makhlouf et al. | 702/69 |
| 7,170,961 B2 * | 1/2007 | Vandenameele-Lepla | 375/371 |
| 8,125,885 B2 * | 2/2012 | Bertrand et al. | 370/203 |
| 2007/0133391 A1 * | 6/2007 | Roh et al. | 370/208 |
| 2007/0160158 A1 | 7/2007 | Zeng et al. | |
| 2008/0095249 A1 * | 4/2008 | Yoon et al. | 375/260 |

OTHER PUBLICATIONS

Lü, Z. et al., "Composite Frequency-Offset Estimator for Wireless Communications", ICC Proceedings, 2007, pp. 1-6, IEEE Communications Society.

* cited by examiner

RECEIVER NODE AND A METHOD THEREIN FOR COMPENSATING FREQUENCY OFFSET

TECHNICAL FIELD

This invention relates to a receiver node and a method therein. In particular, embodiments herein relate to compensation of a frequency offset in a radio communications network.

BACKGROUND

In radio communication networks of today a user equipment communicates information over a radio link to a radio base station by performing a so called uplink (UL) transmission. In Long Term Evolution (LTE) networks an uplink channel, such as a Physical Uplink Shared Channel (PUSCH), is using a Single Carrier-Frequency Division Multiple Access (SC-FDMA) modulation scheme, which is an Orthogonal Frequency Division Multiplexing (OFDM) based modulation scheme. In such schemes the used bandwidth is divided into a multitude of orthogonal subcarriers and transmissions are, as a consequence, sensitive to the effects of frequency offset between a transmitter node, i.e. the user equipment transmitting in the UL, and a receiver node, i.e. the radio base station.

In a radio communications network a user equipment (UE) is communicating with a radio base station in the uplink (UL). There are mainly two reasons why a frequency offset occurs:

One reason is that a downlink (DL) signal transmitted by the radio base station, to which the user equipment locks its local oscillator, may be affected by a Doppler shift due to the movement of the user equipment relative to the radio base station. The user equipment moves at a velocity relative to the radio base station. The uplink signal from the user equipment to the radio base station is then again affected by the Doppler shift. Hence, the radio frequency of the uplink transmission may deviate in frequency by a frequency offset of the local oscillator and a frequency offset of the uplink transmission traveling in the air, resulting in a maximum frequency offset of $$f_{offset} = 2 \times f_d = 2 \times \frac{v \times f_c}{c} \text{ Hz}$$

where
$f_{offset}$ is defined as the maximum frequency offset,
$f_d$ is defined as the frequency offset due to Doppler effect in one transmission direction, UL or DL, which in its turn is defined as $$\frac{v \times f_c}{c}$$

where v is the velocity of the user equipment and c is the speed of light and $f_c$ is a carrier frequency of the UL transmission or DL transmission.

The other reason for frequency offset is that the local oscillator in the UE may be inaccurate, which may amount to a frequency offset of up to ±0.1 parts per million (ppm) of the carrier frequency $f_c$.

Assuming a carrier frequency, $f_c$, of 2.5 GHz, a speed or velocity, v, of 350 km/h, and the speed of light, c, set to $3 \times 10^8$ m/s as in vacuum, the resulting maximum frequency offset becomes $$f_{offset} = 2 \times f_d + 0.1 \times 10^{-6} f_c$$

$$= 2 \times \frac{\frac{350 \times 10^3}{3600} \times 2.5 \times 10^9}{3 \times 10^8} + 250 \approx 1870 \text{ Hz}$$

Generally in radio communications systems frequency offset estimation is based on reception of reference symbols at the receiver node. However, since the reference symbols are received twice per subframe, once per slot i.e. 0.5 ms apart, the maximum frequency offset that can be estimated is ±1000 Hz, which is a severe limitation. This can be viewed as an application of the sampling theorem. If each reference symbol is viewed as a sample, being sampled at a sampling frequency $f_s$, where $$f_s = \frac{1}{0.5 \cdot 10^{-3}} = 2000 \text{ Hz},$$

the highest frequency in the sampled signal that can be uniquely represented is half the sampling rate, i.e. 1000 Hz, which is clearly less than what is needed for speeds around 350 km/h.

Thus, the temporal distribution of the reference symbols only allows frequency offsets up to ±1000 Hz to be estimated unambiguously and higher offsets will "wrap around" about ±1000 Hz. For example, the frequency offset +1100 Hz will be wrapped to −900 Hz leading to an erroneous estimation. This frequency offset ambiguity problem is illustrated in FIG. 1 wherein a true offset is defined along an x-axis and estimated offset along a y-axis. The estimated offset follows a curve, Cu, which is wrapped, that is, looped, when true frequency offset is going beyond ±1000 Hz as indicated by the curves Cu', Cu".

Another aspect of estimating frequency offset is the problem caused by mismatch between the rate of change of the offset and the rate at which receiver node can determine the offset and track the change of the offset. In high-speed train scenarios for instance, the rate of change can be very high as the train passes in close proximity to the base station, especially when the train is traveling in a tunnel.

3rd Generation Partnership Projects (3GPP) Radio Access Network (RAN) Working Group (WG) 4, known as RAN4 for short, has specified two scenarios for high-speed train conditions, one for open space and one for tunnels when using multi-antennas. Due to the Doppler shift trajectory for the tunnel scenario it is desirable to be possible to track rapid changes of the frequency offset.

After that the frequency offset has been estimated it must be compensated for in the received signal. A solution to the above identified frequency offset compensation problem would be to simply compensate time-domain samples before processing the samples by a Fast Fourier Transform (FFT) process in the receiver node. However, this method would require a compensation and an FFT per user since each user has a different frequency offset. The complexity of such a scheme thus becomes prohibitive. Existing frequency offset compensation methods exploit the fact that the reference symbols are Zadoff-Chu sequences. In, for example, the current version of the LTE standard this is only true for allocations of more than 2 resource blocks; smaller allocations use predefined sequences which are not Zadoff-Chu sequences and may not be able to use these frequency offset compensation methods.

SUMMARY

In embodiments herein an object is to provide a mechanism that compensates frequency offsets in a reliable way when traveling at high velocities.

According to a first aspect of embodiments herein the object is achieved by providing a method in a receiver node for compensating a frequency offset of a received data symbol in a signal on an orthogonal frequency division multiplexed carrier from a transmitter node. The receiver node and transmitter node are comprised in a radio communications network. The receiver node receives the signal over a radio channel, which signal has been transmitted in a time structured transmission comprising time slots of a specific length in time. The signal is carrying a first reference symbol and a second reference symbol transmitted in a first time slot and an adjacent second time slot, respectively. The receiver node estimates a first channel estimate of the received first reference symbol and a second channel estimate of the received second reference symbol. The receiver node then determines a first frequency offset estimate based on the first channel estimate and the second channel estimate. Furthermore, the receiver node determines a second frequency offset estimate by adding or subtracting a frequency value to the first frequency offset estimate. The second frequency offset estimate may be referred to as a mirrored frequency offset estimate. The receiver node extracts at least one reference symbol of the first and second reference symbols from the received signal. In addition, the receiver node frequency compensates the extracted at least one reference symbol using the first frequency offset estimate resulting in a first compensated reference symbol. The receiver node also frequency compensates the extracted at least one reference symbol using the second frequency offset estimate resulting in a second compensated reference symbol. The receiver node then correlates each of the respective first and second compensated reference symbols with a target reference symbol. Additionally, the receiver node selects the frequency offset estimate out of the first and second frequency offset estimates giving a largest level of correlation between the corresponding first or second compensated reference symbol and the target reference symbol. The receiver node then compensates the frequency offset of the received data symbol by using the selected frequency offset estimate.

In order to perform the method a receiver node for compensating a frequency offset of a received data symbol in a signal on an orthogonal frequency division multiplexed carrier from a transmitter node is provided. The receiver node and the transmitter node are comprised in a radio communications network. The receiver node comprises a receiving circuit configured to receive the signal over a radio channel, which signal has been transmitted in a time structured transmission comprising time slots of a specific length in time. The signal is carrying a first reference symbol and a second reference symbol transmitted in a first time slot and an adjacent second time slot, respectively. The receiver node comprises an estimating circuit configured to estimate a first channel estimate of the received first reference symbol and a second channel estimate of the received second reference symbol. Furthermore, the receiver node comprises a determining circuit configured to determine a first frequency offset estimate based on the first channel estimate and the second channel estimate. Also, the determining circuit is configured to determine a second frequency offset estimate by adding or subtracting a frequency value to the first frequency offset estimate. The second frequency offset estimate is also referred to as a mirrored frequency offset estimate. The receiver node also comprises an extracting circuit configured to extract at least one reference symbol of the first and second reference symbols from the received signal. Additionally, the receiver node comprises a frequency compensating circuit configured to frequency compensate the extracted at least one reference symbol using the first frequency offset estimate resulting in a first compensated reference symbol. The frequency compensating circuit is also configured to frequency compensate the extracted at least one reference symbol using the second frequency offset estimate resulting in a second compensated reference symbol. The receiver node further comprises a correlating circuit configured to correlate each of the respective first and second compensated reference symbols with a target reference symbol. A selecting circuit is also comprised in the receiver node and configured to select the frequency offset estimate out of the first and second frequency offset estimates giving a largest level of correlation between the corresponding first or second compensated reference symbol and the target reference symbol. The receiver node also comprises a compensating circuit configured to compensate the frequency offset of the received data symbol by using the selected frequency offset estimate.

Thus, embodiments herein overcome the ambiguity problem in a reliable and efficient manner, which ambiguity problem occurs when a UE is traveling at high velocities.

BRIEF DESCRIPTION OF THE DRAWINGS

Embodiments will now be described in more detail in relation to the enclosed drawings, in which.

DETAILED DESCRIPTION

Figure 1:
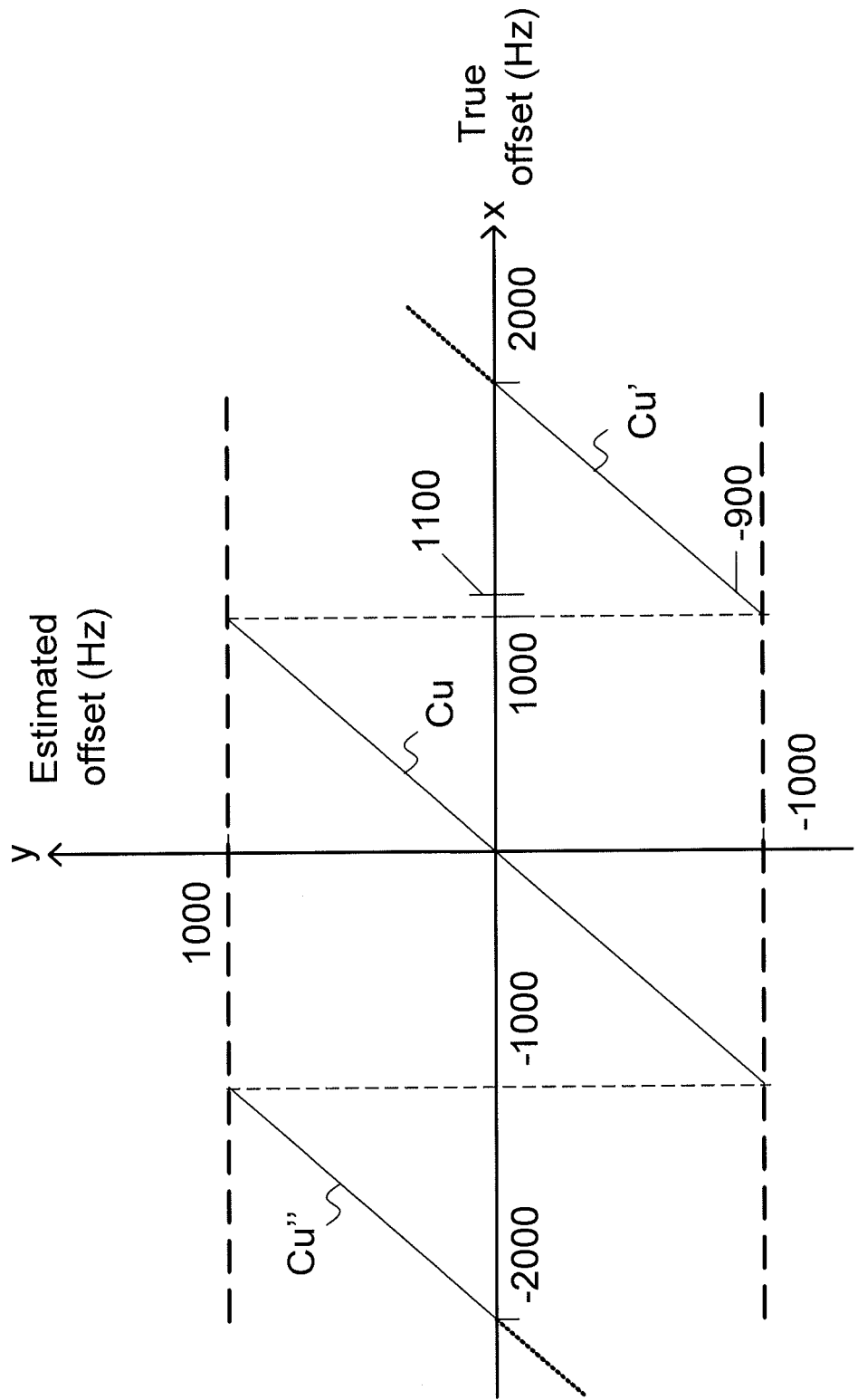
FIG. 1 is a schematic graph depicting a relation between true frequency offset and estimated frequency offset.
Figure 2:
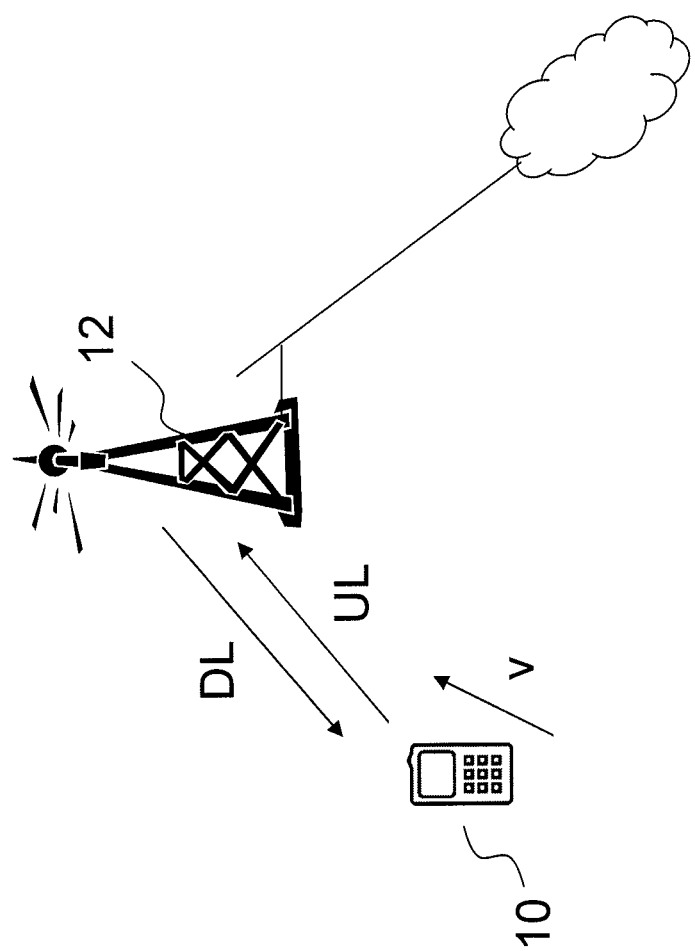
FIG. 2 is a schematic overview depicting a radio communications network.

FIG. 2 provides a general overview of a radio communications network. The radio communications network may be a network according to a standard of e.g. Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention some few possible options where embodiments disclosed herein may be implemented.

A transmitter node, illustrated as a User Equipment (UE) 10, served by a receiver node, illustrated as a radio base station 12, transmits a signal to the radio base station 12 in an uplink (UL) transmission. The UL transmission may efficiently be generated by the use of an Inverse Fast Fourier Transform (IFFT) process at the UE 10 and then demodulated at the radio base station 12 by the use of a Fast Fourier Transform (FFT) process. A set of Resource Blocks (RB) is transmitted to the radio base station 12 comprising subcarriers carrying a reference symbol that may be used to determine a frequency offset. A reference symbol may span a whole allocated bandwidth for the UE 10, i.e. it may be transmitted over 1 to 100 resource blocks.

The orthogonality between the subcarriers implies that, since side lobes of all subcarriers except for one have a zero crossing where the one subcarrier has its main lobe, each subcarrier is unaffected by all other subcarriers after demodulation by the FFT. Orthogonality is, however, only achieved or preserved if the sampling frequency is the same in the UE 10, as in the radio base station 12 and if the frequency of the signal is not affected by the channel. As stated above, the UE 10 locks its frequency to a downlink (DL) signal, which may be affected by a Doppler shift especially when the UE 10 is traveling at a high velocity, v, relative to the radio base station 12. In the UL, the signal may again be subject to a Doppler shift resulting in a frequency offset that is twice the frequency offset occurring in one direction. Also, as stated above, the local oscillator in the UE may be inaccurate.

The effect of the frequency offset is that the subcarriers are no longer orthogonal since the side lobes of the interfering subcarriers no longer have a zero crossing at the main lobe of the desired subcarrier. This spectral leakage is commonly referred to as inter-carrier interference (ICI). If there is a frequency offset, the sampling of a received signal will occur at fractions of the subcarrier indices causing the subcarriers to leak into each other which results in ICI.

As stated above, since the reference symbols occur once per slot i.e. 0.5 ms apart, the maximum frequency offset that may be estimated with this time slot structure is ±1000 Hz. Frequency offsets with larger magnitudes will be "wrapped around". This may, for example, occur for a user equipment travelling at high speed, which leads to an ambiguity problem of not knowing whether the frequency offset estimate is accurate or not.

According to the embodiments herein the ambiguity problem may be solved by compensating the received reference symbols according to two different frequency offset hypotheses; a first frequency offset estimate and a mirrored version of the first frequency offset estimate, also referred to as a second frequency offset estimate. Mirrored herein means that the second frequency offset estimate is obtained as the first frequency offset estimate with a frequency value added or subtracted to the first frequency offset estimate, which frequency value may be the sampling rate of 2000 Hz. Then by comparing the compensated reference symbol of the different frequency offset hypotheses with a target reference symbol, which is known at the receiver node 12, the frequency offset hypothesis which is most probable is used to compensate received data symbol. That is, the frequency offset estimate that generates a compensated reference symbol most coherent with the known reference symbol is selected and used. This frequency offset compensation method is applicable for Physical Resource Block (PRB) allocation of 1 resource block and also more than one resource blocks.

Figure 3:
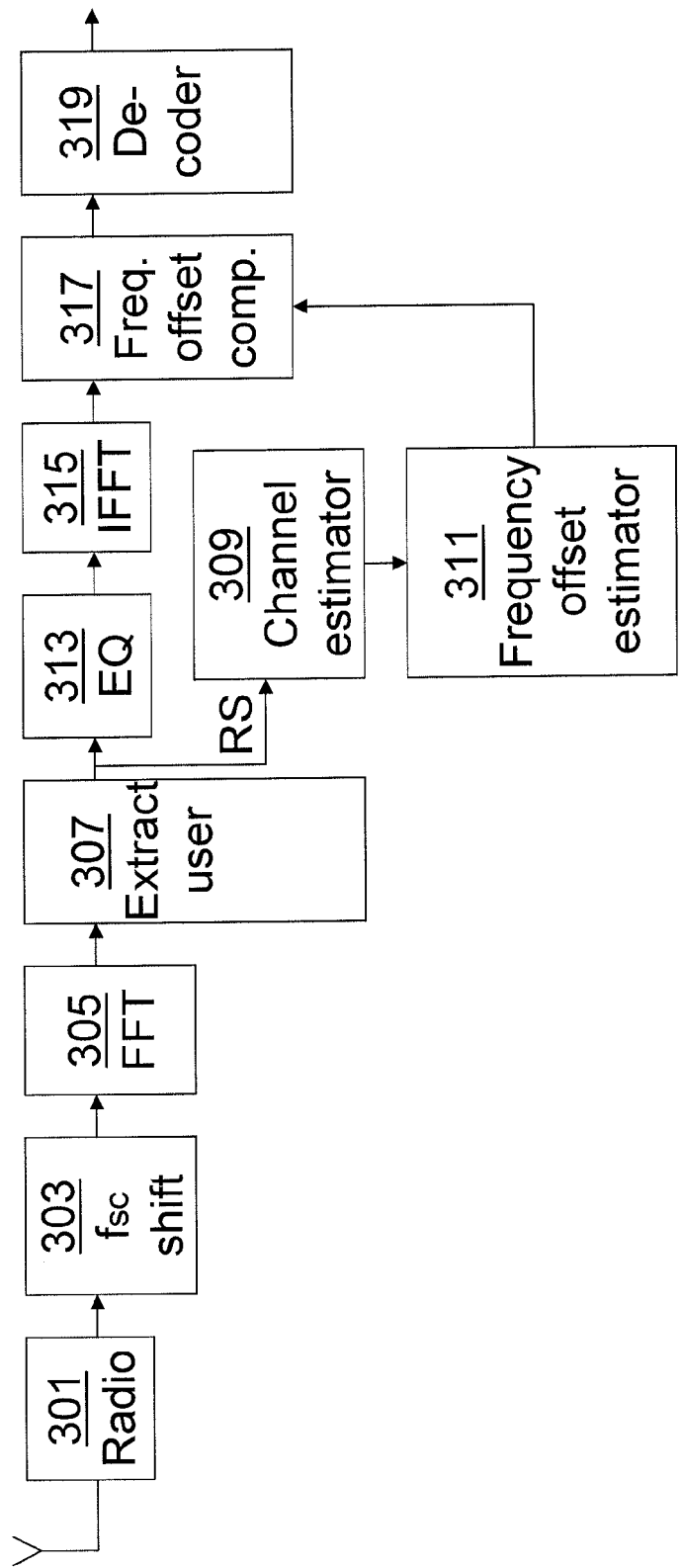
FIG. 3 is a block diagram depicting a frequency offset compensation arrangement in a receiver node.

FIG. 3 shows a schematic overview of the receiver node 12 comprising a frequency offset compensating process that operates to remove the effects of the frequency offset in the frequency domain after the FFT processing. A radio circuit 301 receives a signal comprising Reference Symbols (RS) and Data Symbols (DS). The signal is received over subcarriers transmitted at subcarrier frequencies. A shifter circuit 303 shifts the subcarrier frequency $f_{sc}$ of the received subcarriers to align the subcarriers on a FFT grid. The received signal is then transformed into a frequency domain in a FFT circuit 305. Transmissions of each user equipment may then be extracted from the FFT circuit 305 in an extract user circuit 307 and compensated independently of transmissions from other user equipments. In the illustrated example a channel estimator circuit 309 estimates the channel estimate based on the received RS. A frequency offset estimator circuit 311 estimates the frequency offset from channel estimates of adjacent time slots.

That is, each uplink subframe produces two channel estimates, a first channel estimate and a second channel estimate, one per slot. In order to estimate the frequency offset, a phase difference between these two channel estimates is calculated. This is done by multiplying the channel estimate from one slot by a complex conjugate of the channel estimate from the other slot. The multiplication is calculated per subcarrier and per antenna and is then averaged in order to reduce the variance of the result.

One may exploit the fact that in, for example, Single Carrier Frequency Division Multiplex Access (SC-FDMA) the signal is transformed back to the time-domain again in an IFFT circuit 315 after equalization in an equalizer (EQ) 313. The time domain signal may then be efficiently compensated for the frequency offset in a frequency offset compensator circuit 317 by compensating the time domain signal in frequency. The data symbols of the received signal are then recovered by decoding the compensated received signal in a decoder 319. As stated above, since the reference symbols occur once per slot i.e. 0.5 ms apart, the maximum frequency offset that can be estimated is ±1000 Hz. Frequency offset estimates with larger magnitudes will be "wrapped around" as stated above.

Thus, there are two possible frequency offset estimates; a first frequency offset estimate and a second frequency offset estimate, also referred to as a mirrored frequency offset estimate. Because of this ambiguity the first frequency offset estimate may be determined by first "unwrapping" an initial frequency offset estimate from the channel estimator 309. An unwrapping operation means that the first frequency offset estimate falls outside the limit ±1000 Hz. The true frequency offset estimate is then either the first frequency offset estimate or the second frequency offset estimate, which may be the first frequency offset estimate mirrored or wrapped back again. In the following embodiments disclosed the process has been configured to solve the ambiguity problem.

Figure 4:
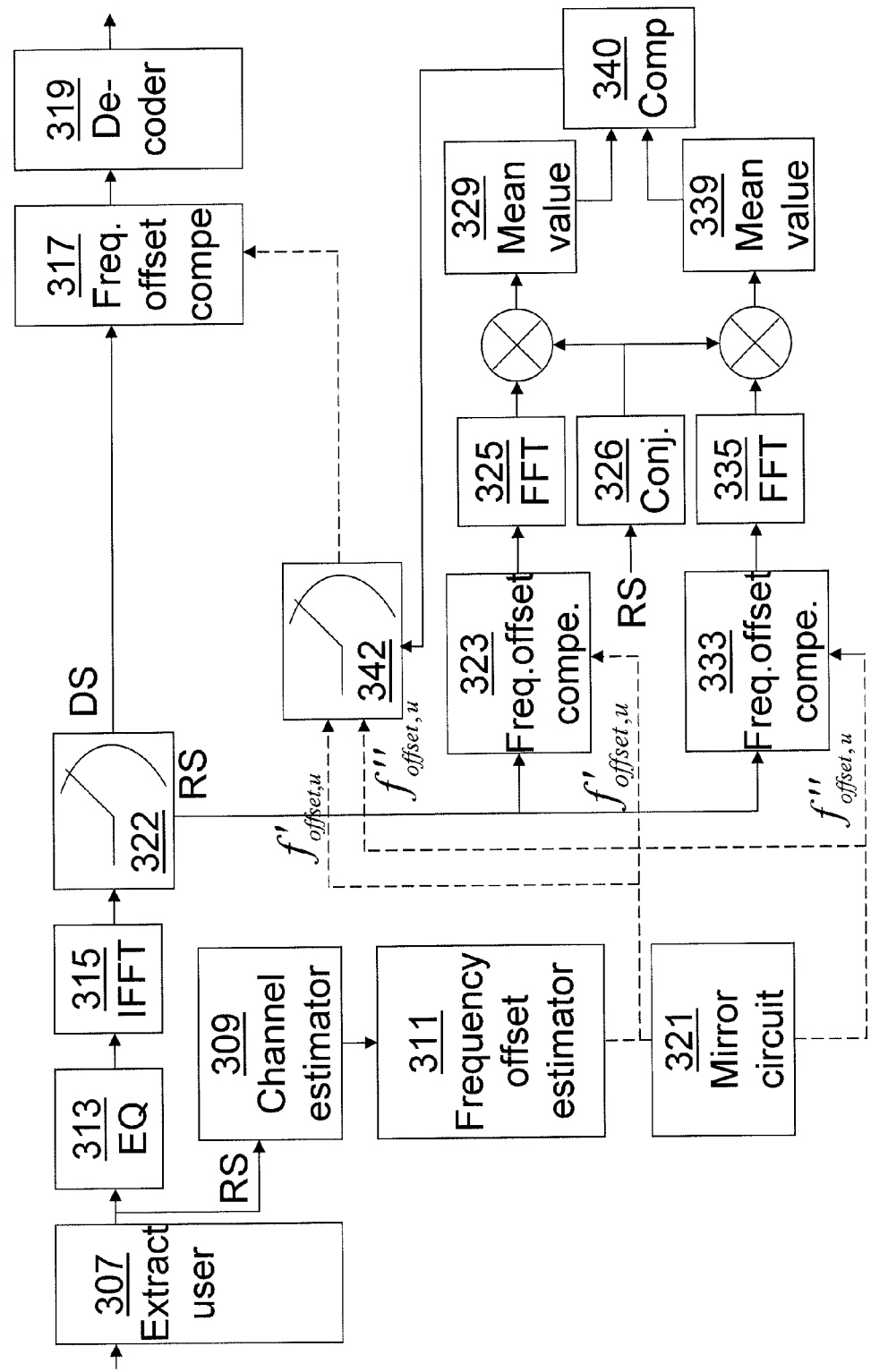
FIG. 4 is a block diagram depicting a frequency offset compensation arrangement in a receiver node.

A block diagram of embodiments herein is illustrated in FIG. 4. In FIG. 4, the abbreviation RS refers to Reference Symbol, while the abbreviation DS refers to Data Symbol. Dotted lines in the figure are used to indicate parameters. It should be noted that the process may be performed on a plurality of Data Symbols using a plurality of Reference Symbols.

As shown above in FIG. 3, a reference symbol from each user equipment may be extracted in the extract user circuit 307 after the FFT process. The channel estimator circuit 309 estimates a channel estimate based on two different reference symbols received in two adjacent slots. The frequency offset estimator 311 estimates a first frequency offset estimate $f_{offset,u}$ based on the channel estimate from the channel estimator circuit 309.

Embodiments herein compensate the received reference symbols according to two different frequency offset hypotheses; the first frequency offset estimate $f_{offset,u}$ based on the channel estimate, and the second frequency offset estimate f"$_{offset,u}$, which in this example is obtained by wrapping around the first frequency offset estimate f'$_{offset,u}$. This second frequency offset estimate f"$_{offset,u}$ is also referred to as the mirrored frequency offset estimate and may be calculated using the following relation:

$$f''_{offset,u} = \begin{cases} f'_{offset,u} - 2000 & f'_{offset,u} \geq 0 \\ f'_{offset,u} + 2000 & f'_{offset,u} < 0 \end{cases}$$

The compensated reference symbol which most closely resembles the known transmitted reference symbol is then determined by correlation. The correlation is performed between a first compensated reference symbol, compensated with the first frequency offset estimate, and the known transmitted reference symbol and a second compensated reference symbol, compensated with the second frequency offset estimate, and the known transmitted reference symbol, also referred to as target reference symbol (RS).

To determine the second frequency offset estimate, a mirror circuit 321 wraps the first frequency offset estimate f'$_{offset,u}$ from the frequency offset estimator circuit 311. This second frequency offset estimate f"$_{offset,u}$ enables the determination of a more correct frequency offset estimate. The mirror circuit 321 performs the wrapping procedure by adding or subtracting a frequency value to the first frequency offset estimate f'$_{offset,u}$. The frequency value may be preset to a value of approximately 2000 Hz. This value is based on the limitation that the maximum frequency offset that can be estimated is ±1000 Hz. The frequency value is subtracted if the first frequency offset estimate f'$_{offset,u}$ from the frequency offset estimator 311 is positive and added if the first frequency offset estimate f"$_{offset,u}$ from the frequency offset estimator 311 is negative.

The first frequency offset estimate f'$_{offset,u}$ and the second frequency offset estimate f"$_{offset,u}$ are then used in a comparing process to determine which one of the frequency offset estimates f'$_{offset,u}$ and f"$_{offset,u}$ is the most accurate frequency offset estimate. This is performed in the illustrated example in the following way. The received signal may be transformed back to the time-domain again in the IFFT circuit 315 after being equalized in the equalizer 313 and in a reference symbol extractor 322 the reference symbol or symbols in the received signal are extracted. The extracted reference symbol/s are then fed to a first frequency offset compensator 323 and to a second frequency offset compensator 333. The extracted reference symbol/s are then compensated for the respective first and second frequency offset estimates f'$_{offset,u}$ and f"$_{offset,u}$ from the frequency offset estimator 311 and the mirror circuit 321 in the frequency offset compensators 323, 333.

A first compensated reference symbol from the first frequency offset compensator 323 may then be transformed into the frequency domain in a Fast Fourier Transform circuit 325. The target RS from a Conjugate Circuit 326 may then be correlated with the first transformed compensated reference symbol from the Fast Fourier Transform circuit 325. The target RS may be received from a transmitter node or be preconfigured in the receiver node 12. In order to reduce the variance of the correlation, an absolute value of the correlation may be obtained by filtering the correlation in a leaky integrator in a mean value circuit 329. The leaky integrator may be described by an expression, described below in conjunction to FIG. 6, using a fixed forgetting factor α$_{corr}$. It should be noted that although α$_{corr}$ is fixed it is possible to use different values depending on the Signal to Noise Ratio (SNR) since a receiver node receiving a signal with high SNR will require less averaging of the correlation compared to a receiver node that experiences low SNR in the received signal.

Furthermore, a second compensated reference symbol from the second frequency offset compensator 333 is then transformed into the frequency domain in a Fast Fourier Transform circuit 335. The target RS from the Conjugate Circuit 326 is then correlated with the second transformed compensated reference symbol from the Fast Fourier Transform circuit 335. In order to reduce the variance of the correlation, the absolute value of the correlation may be obtained by filtering the correlation in a leaky integrator in a mean value circuit 339.

It should be noted that the metric of the comparison is the correlation at lag zero. Consequently, before determining the correlation, the first and second compensated reference symbols, as stated above, are transformed back to the frequency domain by the FFT circuits 325 and 335 and the scalar product of the resulting first and second compensated reference symbols and the complex conjugate of the target RS are computed. In order to reduce the variance of the correlation, the absolute values of the correlations may be obtained by filtering the correlations in leaky integrators.

The correlations of the first compensated reference symbol and the second compensated reference symbol are then compared in a comparing circuit 340. Then, in a selection circuit 342 the frequency offset hypothesis corresponding to the largest correlation is selected. The data symbols are compensated using that selected frequency offset estimate in the frequency offset compensator 317 and the compensated data symbols are then decoded in the decoder circuit 319.

Thus, the hypothetical first or second frequency offset estimate corresponding to the largest level of correlation is selected and the data symbols or reference signals are compensated using that selected frequency offset estimate.

An advantage of embodiments herein is the possibility to estimate frequency offsets with magnitudes larger than 1000 Hz. This will allow data from user equipments moving at higher speeds to be received correctly, facilitating high-speed train scenarios etc.

The frequency offset estimator procedure is independent of the construction of the reference symbols and will therefore work for reference symbols spanning over all bandwidths.

Embodiments herein solve the ambiguity problem by performing frequency offset compensation of the reference symbols in the same way as for the data symbols i.e. in the time-domain after equalization. As described above, the compensation is performed for two different frequency offset hypotheses; the first frequency offset estimate from, for example, a previous unwrapping operation see FIG. 5, and for the mirrored version of the first frequency offset estimate.

It is then determined which one of the two compensated reference symbols that most resembles the target or known transmitted reference symbol in the comparison circuit 340. The data symbols are compensated using this frequency offset estimate.

Embodiments herein disclose a way to estimate a first frequency offset estimate by unwrapping an initial frequency offset estimate. As stated above this means that the first frequency offset estimate is outside the limit ±1000 Hz. Embodiments of determining the first frequency offset estimate f'$_{offset,u}$ are described in the block diagram in FIG. 5 in the frequency offset estimator 311 in the receiver node 12.

An initial frequency offset f̂$_{offset,u}$ is estimated based on received reference symbols by comparing channel estimates of reference symbols of adjacent time slots.

Step 51. The receiver node 12 unwraps the initial frequency offset $\hat{f}_{offset,u}$ by adding or subtracting an unwrap frequency value, for example 2000 Hz, into an unwrapped frequency offset estimate $\tilde{f}_{offset,u}$. This unwrapped frequency offset estimate $\tilde{f}_{offset,u}$ may be set as the first frequency offset $f'_{offset,u}$ or be further processed in the frequency offset estimator 311. The unwrap frequency value may be based on a sampling rate of the signal.

Step 52. The unwrapped frequency offset estimate $\tilde{f}_{offset,u}$ may then optionally be filtered in an e.g. averaging or filtering process to achieve smoothening of the frequency offset estimates. A resulting averaged unwrapped frequency offset estimate $\bar{f}_{offset,u}$ may then be further processed in the frequency offset estimator 311 or the averaged unwrapped frequency offset estimate $\bar{f}_{offset,u}$ may be set as the first frequency offset estimate $f'_{offset,u}$.

Step 53. The receiver node 12 may optionally monitor the averaged unwrapped frequency offset estimate $\bar{f}_{offset,u}$. When the averaged unwrapped frequency offset estimate $\bar{f}_{offset,u}$ is moving beyond a preset highest possible frequency offset estimate, called high threshold frequency offset, or a lowest possible frequency offset estimate, called low threshold frequency offset, the receiver node 12 may wrap the averaged unwrapped frequency offset estimate to be taken as the first frequency offset estimate $f'_{offset,u}$. It should be noted that the first frequency offset estimate $f'_{offset,u}$ may not necessarily have to be altered in the different processes and in some embodiments the first frequency offset estimate $f'_{offset,u}$=the initial frequency offset estimate $\hat{f}_{offset,u}$.

Figure 5:
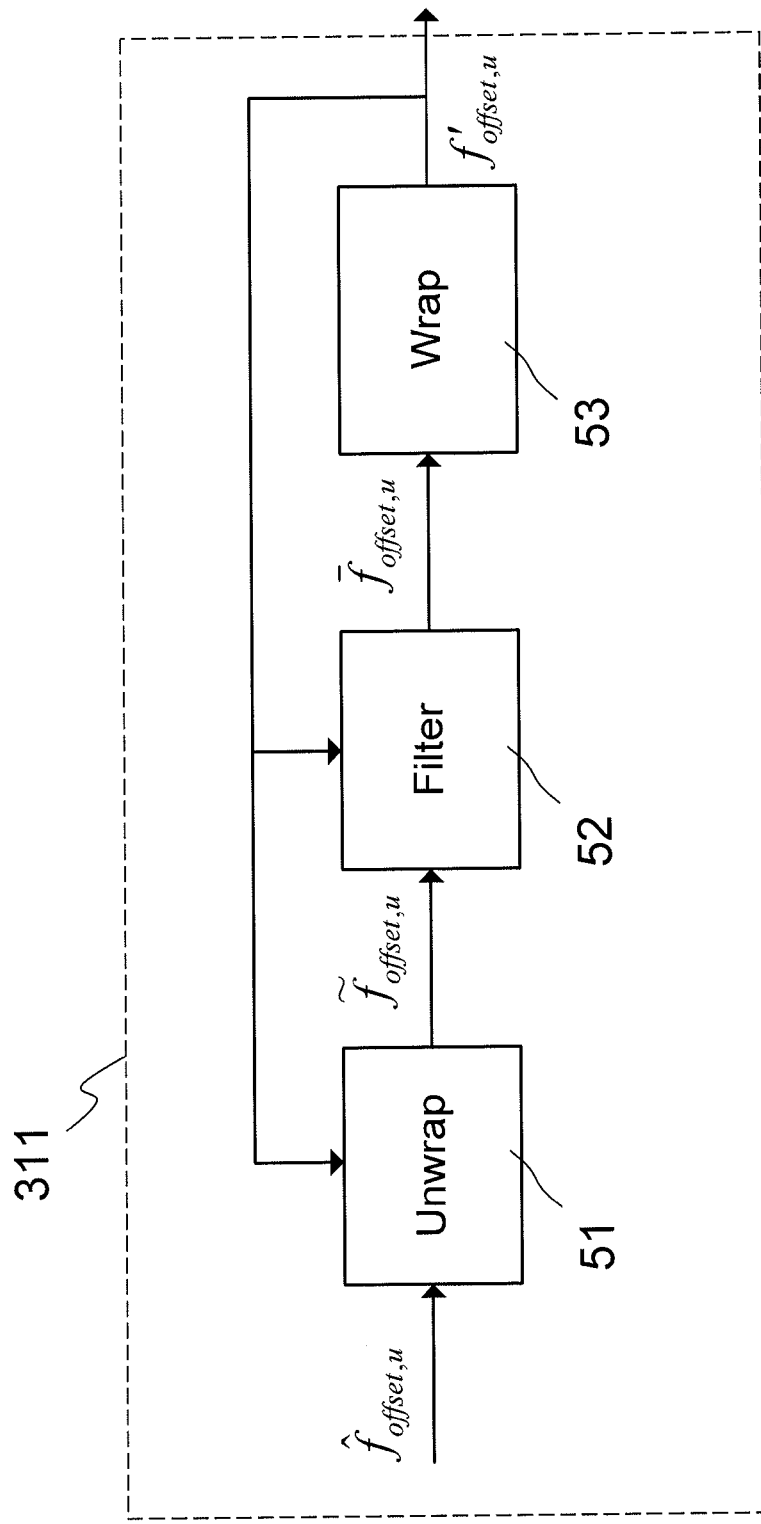
FIG. 5 is a block diagram depicting a process to estimate a frequency offset.
Figure 6:
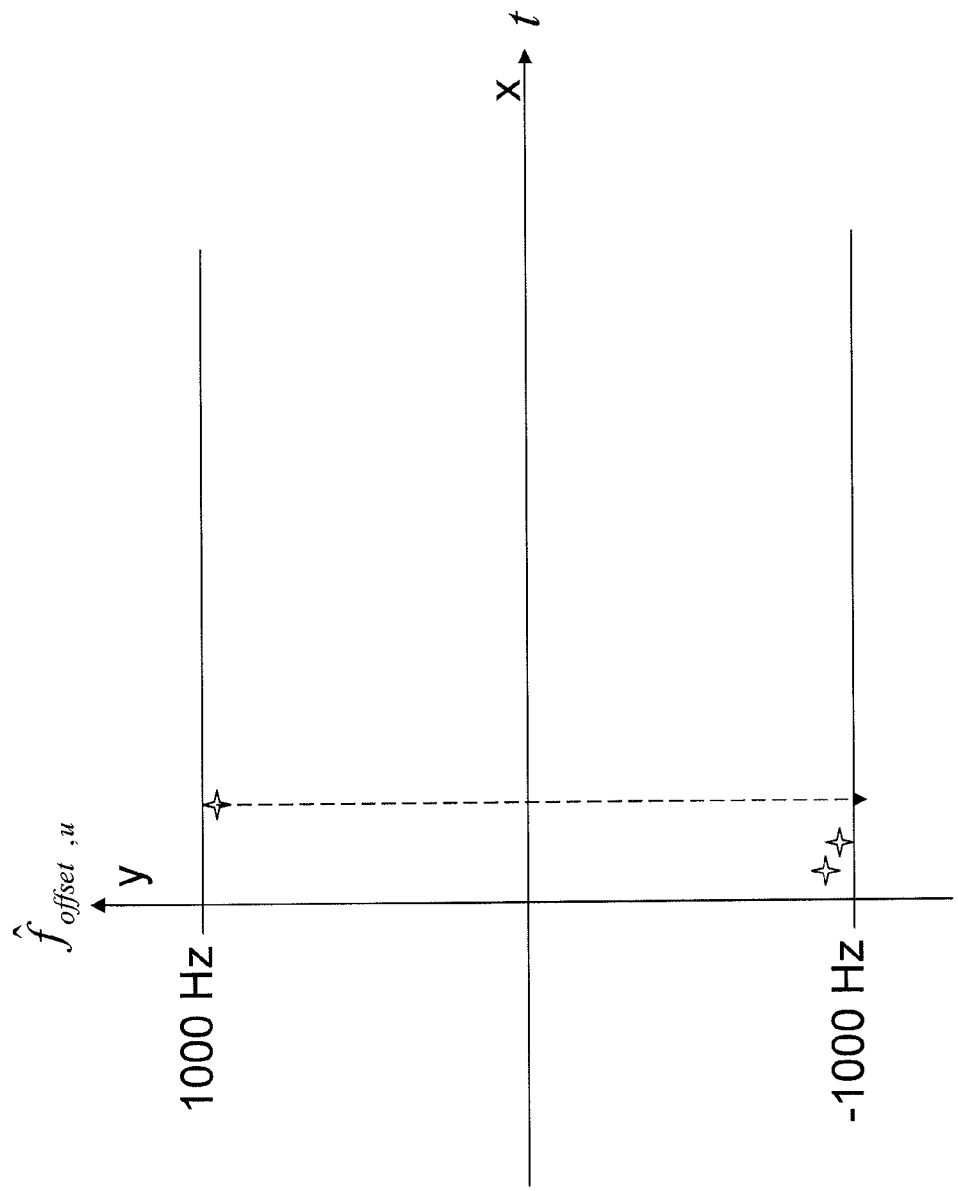
FIG. 6 is a schematic graph depicting a relation between frequency offset estimates and time.

FIG. 6 is a graph illustrating a relation between frequency offset estimates and time. In some embodiments of the present solution the unwrapping operation of step 51 in FIG. 5 compares each new or latest initial frequency offset estimate to the mean or average of all or a plurality of the previous first frequency offset estimates. In this process it is detected if the latest initial frequency offset estimate differs from the first frequency offset estimate or a mean of previous first frequency offset estimates by more than e.g. 1000 Hz. This indicates that a wrap-around is likely to have occurred and the latest initial frequency offset estimate is adjusted by adding or subtracting an unwrap frequency value, e.g. 2000 Hz, depending on whether the estimate is positive or negative.

In FIG. 6 the latest initial frequency offset estimate is around +950 Hz. Averaging the latest initial frequency offset estimates with previous first frequency offset estimates, which are exemplified to be around −950 HZ, may result in an erroneous frequency offset estimate around 0 Hz. However, according to embodiments of the present solution the process would subtract the frequency offset estimate down to −1050 Hz which is much closer to the previous first frequency offset estimates. The averaging process then results in a more likely frequency offset estimate of around −1000 Hz.

The unwrapping operation may be described by the following expression:

$$\tilde{f}_{offset,u} = \begin{cases} \hat{f}_{offset,u} - 2000, & \hat{f}_{offset,u} \geq f'_{offset,u} + 1000 \\ \hat{f}_{offset,u} + 2000, & \hat{f}_{offset,u} < f'_{offset,u} - 1000 \\ \hat{f}_{offset,u}, & \text{otherwise} \end{cases}$$

where
$\hat{f}_{offset,u}$ is the current/initial frequency offset estimate,
$f'_{offset,u}$ is the previous first frequency offset estimates or the mean of a number of previous first frequency offset estimates, and
$\tilde{f}_{offset,u}$ is the unwrapped frequency offset estimate,
where subscript u indicates that the estimates pertain to user equipment u.

As shown in the expression above the unwrapped frequency offset $\tilde{f}_{offset,u}$ may without any subtraction of addition be taken to be the first frequency offset estimate $\hat{f}_{offset,u}$ when not differing from the $f'_{offset,u}$ by more than ±1000 Hz.

By centering the frequency offset estimate on one frequency as in step 51 in FIG. 5 the receiver node 12 may achieve smoothening of noisy frequency offset estimates by use of an integrator, which would not be so easily accomplished if the estimates were located 2000 Hz apart. The advantage of reducing the variance of the frequency offset estimates at the beginning of the processing, rather than at the end, is that larger frequency offsets can be accommodated, since subsequent blocks need not take the large variance in the initial frequency offset estimate into account.

Thus, unwrapping according to step 51 allows easy filtering or averaging of the frequency offset estimates. The filter may for instance be a leaky integrator in step 52 described by the following expression:

$$\bar{f}_{offset,u}(n) = \alpha_u(n) \cdot \tilde{f}_{offset,u}(n) + (1 - \alpha(n)) \cdot f'_{offset,u}(n-1)$$

where
n is introduced to denote a time instance of each variable, incrementing for each subframe that user u is scheduled.
$\bar{f}_{offset,u}(n)$ is defined as the averaged unwrapped frequency offset estimate of the time instance and
$f'_{offset,u}(n-1)$ is the first frequency offset estimate of the previous time instance in the filter,
$\alpha_u(n)$ is a forgetting factor in the integrator that depends on the time instance, and
$\tilde{f}_{offset,u}(n)$ is the unwrapped frequency offset estimate of the time instance.

An initial value, $f'_{offset,u}(0)$, in the filter is either zero, if the frequency offset estimate is unknown, or an estimate of the frequency offset obtained from the random access procedure as described below in FIG. 8.

The forgetting factor $\alpha_u(n)$ in the integrator is inversely proportional to the number of received subframes, up to a configurable number of subframes K, for user u.

The $\alpha_u(n)$ is described by the following expression:

$$\alpha_u(n) = \max\left(\frac{1}{n+1}, \frac{1}{K}\right)$$

It should also be noted that with this notation the first subframe is the one for which n=0.

The averaging filter used in e.g. step 52 uses a varying forgetting factor has an immediate response to the input signal instead of the slow transient response which would be the case if the forgetting factor $\alpha_u(n)$ was fixed. This allows rapid convergence and follows change of the frequency offset rapidly.

Figure 7:
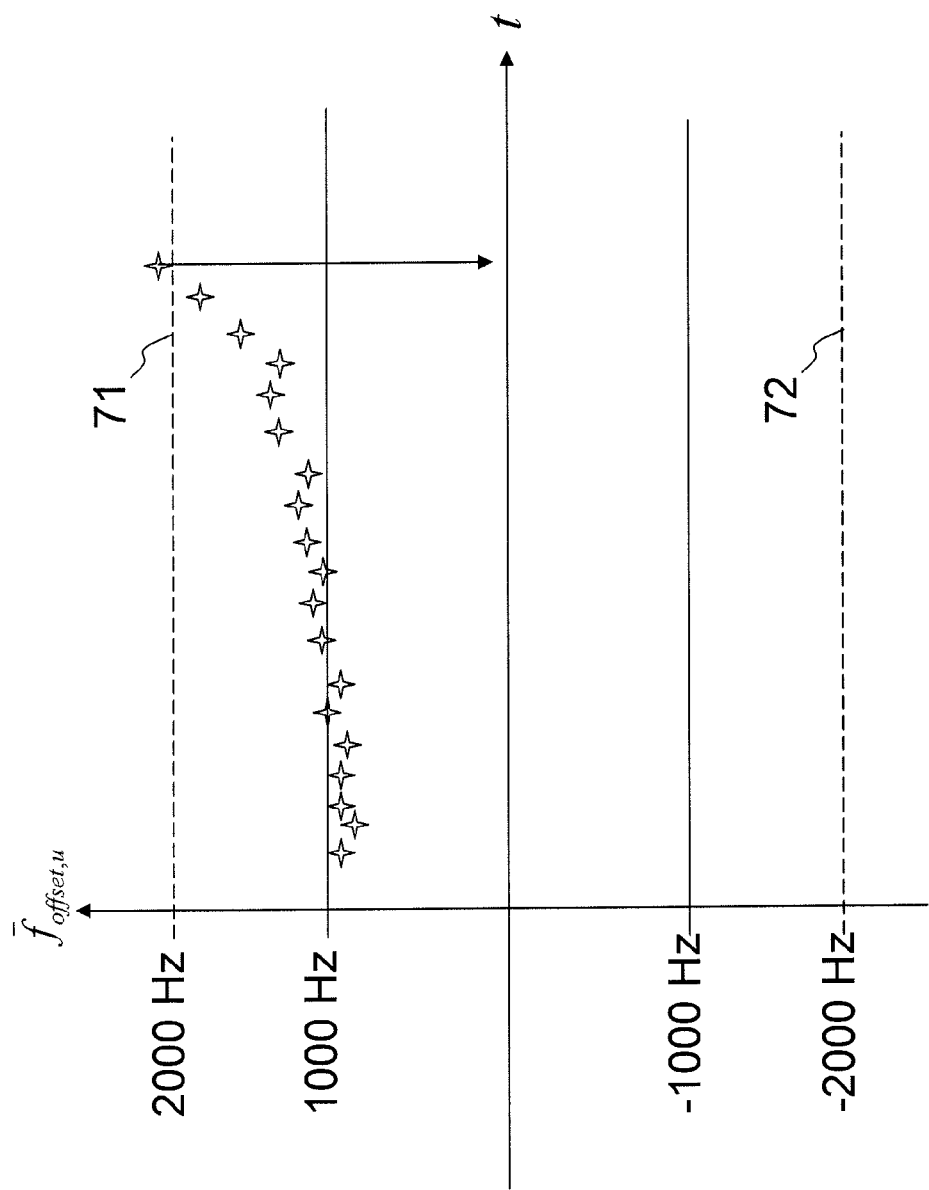
FIG. 7 is a schematic graph depicting a relation between frequency offset estimates and time.

FIG. 7 shows a graph depicting averaged unwrapped frequency offset estimates $\bar{f}_{offset,u}$ in relation to time, t. The illustrated graph exemplifies a situation where the averaged unwrapped frequency offset estimate diverge above a maximum frequency offset 71, referred herein as a high threshold frequency offset, in the range of maximum 1870 Hz e.g. 2000 Hz. In order to avoid that the filtered averaged unwrapped estimate $\bar{f}_{offset,u}$ arts to diverge, a wrapping operation is performed as stated in step 53 in FIG. 5. It should be understood that the averaged unwrapped frequency offset estimate may in other cases diverge below a minimum frequency offset 72, referred herein as a low threshold frequency offset.

This operation wraps-around any averaged unwrapped frequency offset estimate $\bar{f}_{offset,u}$ which is outside the range ±2000 Hz as described by the following expression:

$$f'_{offset,u} = \begin{cases} \bar{f}_{offset,u} - 2000, & \bar{f}_{offset,u} \geq 2000 \text{ Hz} \\ \bar{f}_{offset,u} + 2000, & \bar{f}_{offset,u} < -2000 \text{ Hz} \\ \bar{f}_{offset,u}, & \text{otherwise} \end{cases}$$

where
$\bar{f}_{offset,u}$ is the averaged unwrapped frequency offset estimate, and
$f'_{offset,u}$ is the first frequency offset estimate, which may be the wrapped averaged unwrapped frequency offset estimate if the averaged unwrapped frequency has diverged outside said thresholds. Otherwise the first frequency offset estimate is set to the averaged unwrapped frequency offset estimate.

The wrapping operation is performed outside a range of ±2000 Hz. However, it should here be understood that the range may be in the area of ±1600 Hz-±2100 Hz depending on what is a maximum possible frequency offset in the radio communications network. The wrapping operation wraps the averaged unwrapped frequency offset estimate $\bar{f}_{offset,u}$ with a wrap frequency value of 2000 Hz. The wrap frequency value may be based on a sampling rate of the signal and depend on the separation in time between the reference symbols in the received signal.

Thus, from these optional performance steps the first frequency offset estimate $f'_{offset,u}$ may be generated.

Figure 8:
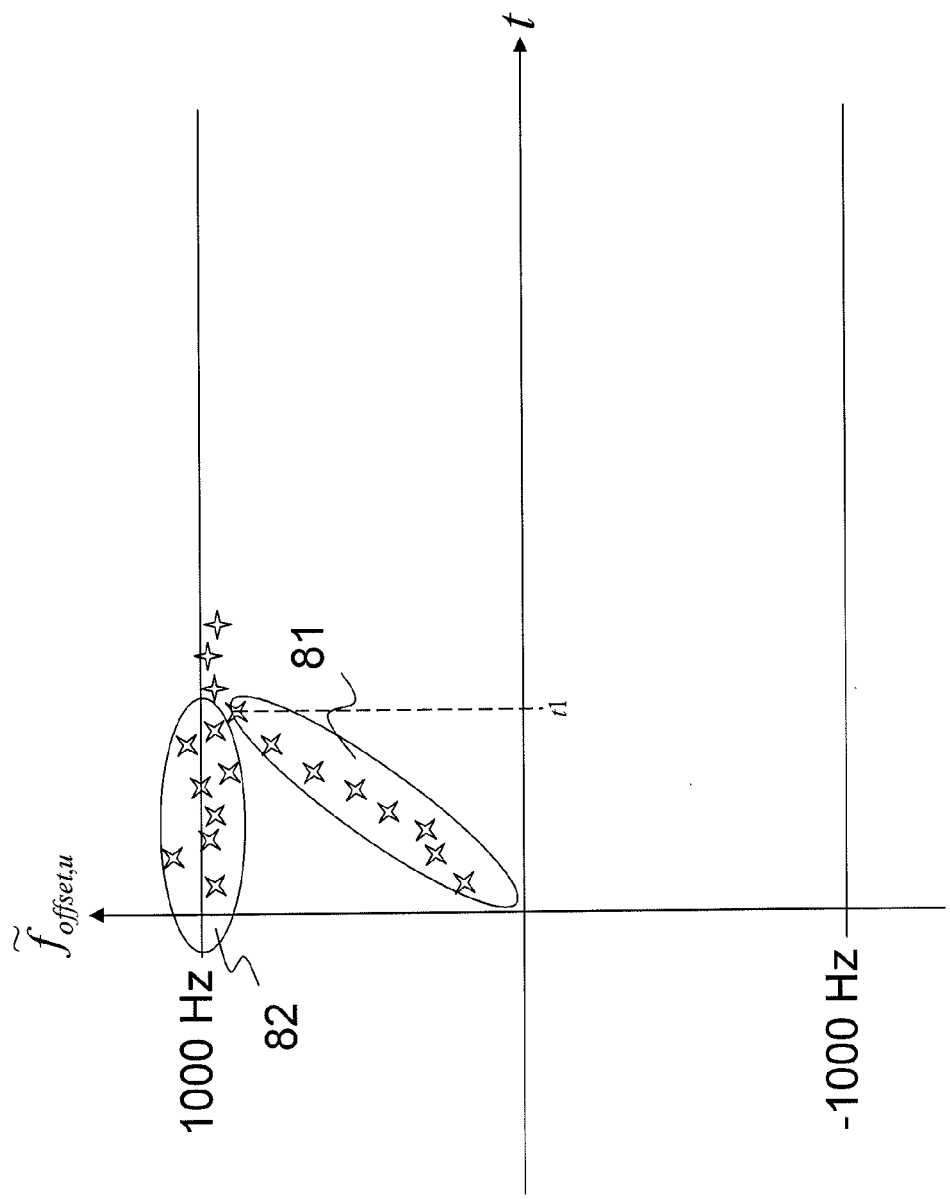
FIG. 8 is a schematic graph depicting a relation between frequency offset estimates and time.

FIG. 8 is a schematic graph illustrating the relation between frequency offset estimates and time. In the graph a first sequence of frequency offset estimates 81 illustrates the convergence towards the actual frequency offset value. The convergence takes a time t1. Embodiments herein may however speed up this convergence. A second sequence of frequency offset estimates 82 illustrates the rapid convergence of a frequency offset estimate determined by using an initial frequency offset estimate $\hat{f}_{offset,u}$ obtained from the random access procedure, which will result in small data loss also in high-speed scenarios as the frequency offset estimate is not as erroneous during the time t1 as when not obtaining the initial frequency offset estimate $\hat{f}_{offset,u}$ from the random access process.

Thus, in order to improve the rate of convergence when the frequency offset is estimated on, for example, Physical Uplink Shared Channel (PUSCH) the random access procedure may be used to provide an initial frequency offset estimate. Thereby, a rough estimate of the frequency offset may be provided by a high-speed enabled Physical Random Access Channel (PRACH) receiver node by reporting which frequency offset hypothesis yields the largest correlation. The resolution of this method is thus dependent on how many hypotheses that are used by the receiver node 12. In a practical implementation this number is probably limited to 3 or at most 5 hypotheses.

Thus, it is possible to construct an algorithm that is based on results from the PRACH receiver node, i.e. the detected peaks of received signals from the UE 10 and their power, with the purpose of providing a more accurate initial frequency offset estimate. Such an algorithm would compare the amplitude of the correlation peaks of a detected preamble and a secondary peak that appears at a known distance from the main peak due to the frequency offset since the preamble is based on a Zadoff-Chu sequence. The relation of these two peaks is proportional to the frequency offset and an arbitrary resolution can be obtained.

Figure 9:
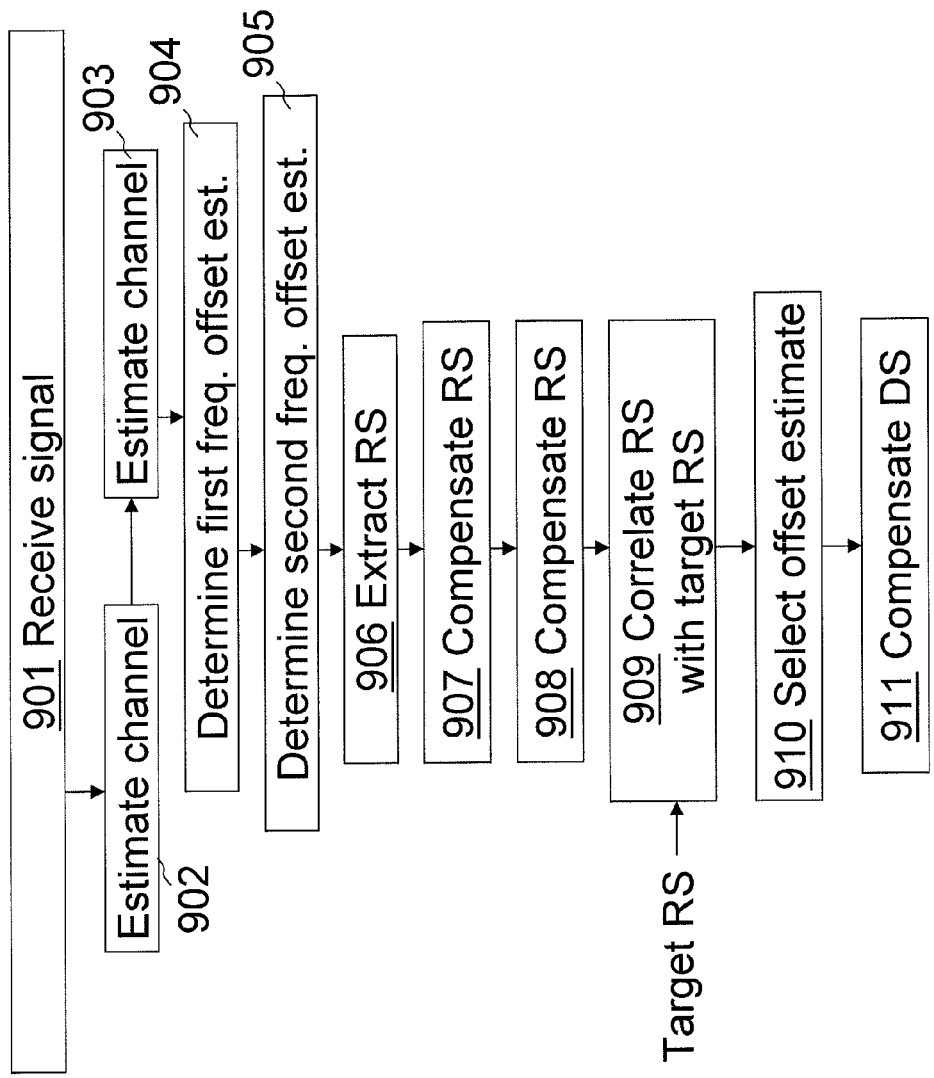
FIG. 9 is a schematic flow chart of a method for frequency offset compensation.

The method steps in the receiver node, referred to as a radio base station 12 in the figures, for compensating a frequency offset of a received data symbol in a signal on an orthogonal frequency division multiplexed carrier from a transmitter node according to some general embodiments will now be described with reference to a flowchart depicted in FIG. 9. The steps do not have to be taken in the order stated below, but may be taken in any suitable order. The receiver node 12 and the transmitter node 10 are comprised in a radio communications network.

Step 901. The receiver node 12 receives a signal over a radio channel. The signal has been transmitted in a time structured transmission comprising time slots of a specific length in time. The specific length in time may be preset. Furthermore, the signal is carrying a first reference symbol and a second reference symbol transmitted in a first time slot and an adjacent second time slot, respectively.

Step 902. The receiver node 12 estimates a first channel estimate of the received first reference symbol.

Step 903. The receiver node 12 estimates a second channel estimate of the received second reference symbol.

It should here be noted that the received signal may be Fast Fourier Transformed and extracted per user before performing the channel estimation of the received reference symbols.

Step 904. The receiver node 12 determines a first frequency offset estimate based on the first channel estimate and the second channel estimate. The first frequency offset estimate may be based on a covariance of the first and second channel estimates.

In some embodiments the step of determining the first frequency offset estimate further comprises to calculate an unwrapped frequency offset estimate by adding or subtracting an unwrap frequency value based on a difference between an initial frequency offset estimate and an average of previous first frequency offset estimates. The initial frequency offset estimate may be based on the first and second channel estimates This unwrap frequency value may be approximately 2000 Hz, −2000 Hz or in a range of 1600-2100 Hz or −1600-−2100 Hz. In some embodiments, the first frequency offset estimate is determined by further filtering the unwrapped frequency offset estimate by e.g. averaging the unwrapped frequency offset estimate with previous first frequency offset estimates into an averaged frequency offset estimate. Also, in some embodiments to avoid that the averaged frequency offset estimate diverge the receiver node 12 may add or subtract a wrap frequency value to the averaged frequency offset estimate if the averaged frequency offset estimate is outside one or more frequency offset thresholds, i.e. above a high frequency threshold or below a low frequency threshold. It should here be noted that the frequency offset thresholds may be set to a value in a range of 1600-2100 Hz or −1600-−2100 Hz based on maximum possible frequency offset estimate and the wrap frequency value may have a corresponding range based on a sampling rate of the signal.

Step 905. The receiver node 12 determines a second frequency offset estimate by adding or subtracting a frequency value to the first frequency offset estimate. The frequency value may be set to approximately ±2000 Hz or to a value in a range of 1800-2100 Hz or −1800-−2100 Hz. The second frequency offset estimate may be referred to as a mirrored frequency offset estimate and the frequency value may be related to a sampling rate of the signal.

Step 906. The receiver node 12 extracts at least one reference symbol of the first and second reference symbols of the received signal.

Step 907. The receiver node 12 frequency compensates the extracted at least one reference symbol using the first frequency offset estimate resulting in a first compensated reference symbol.

Step 908. The receiver node 12 frequency compensates the extracted at least one reference symbol using the second frequency offset estimate, that is the mirrored frequency offset estimate, resulting in a second compensated reference symbol.

In some embodiments, the receiver node 12 further transforms the respective compensated reference symbols in a Fast Fourier Transform process before correlating the respective first and second compensated reference symbols with a target reference symbol.

Step 909. The receiver node 12 correlates each of the respective first and second compensated reference symbols with the target reference symbol.

Step 910. The receiver node 12 selects the frequency offset estimate out of the first frequency offset estimate and the second frequency offset estimate giving a largest level of correlation between the corresponding first or second compensated reference symbol and the target reference symbol.

Also, in some embodiments the receiver node 12 performs an averaging of the respective first and second compensated reference symbols before selecting one out of the first and second frequency offset estimates. This may be done by performing a mean value process on the first and second compensated reference symbols.

Step 911. The receiver node 12 compensates the frequency offset of the received data symbol by using the selected frequency offset estimate.

It should here be noted that the signal may be received over a Random Access Channel mapped onto a Physical Random Access Channel. Then, in some embodiments, the determined first frequency offset estimate or the initial frequency offset estimate is based on the signal on the random access channel and given a larger weight than the second frequency offset estimate when selecting the frequency offset estimate to be used to compensate the frequency offset of the received data symbol. Thus, if the initial frequency offset estimate is obtained from the random access procedure, the first frequency offset estimate hypothesis, $f_{offset,u}$, is more likely and may consequently be given a larger weight when comparing the correlations. This may be done by assigning a larger value to the integrator mentioned above in conjunction with FIG. 6 for the first frequency offset estimate $f_{offset,u}$ when comparing the correlations.

Figure 10:
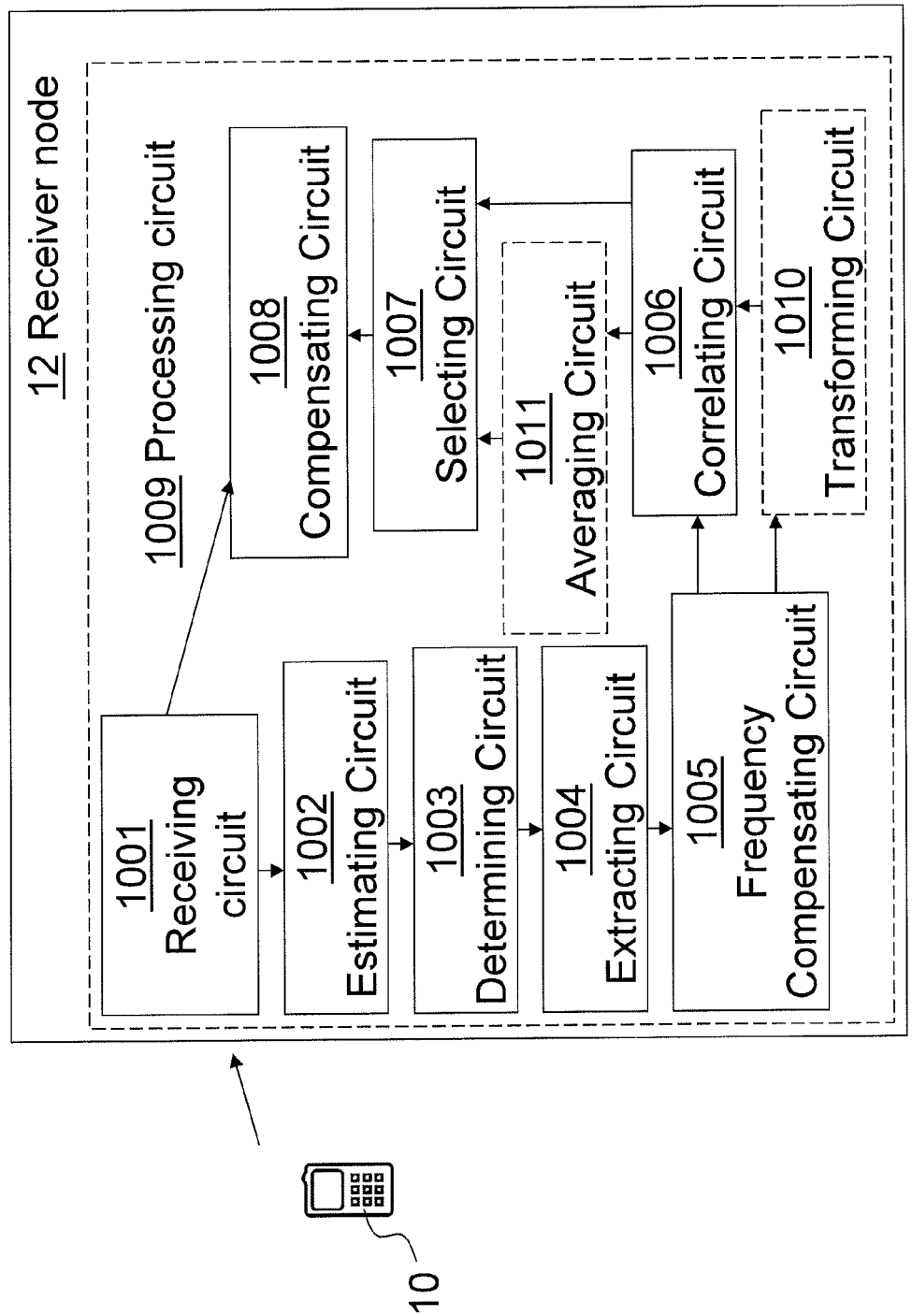
FIG. 10 is a block diagram depicting a receiver node in a radio communications network.

In order to perform the method a receiver node 12 is provided. FIG. 10 is a block diagram of the receiver node 12 for compensating a frequency offset of a received data symbol in a signal on an orthogonal frequency division multiplexed carrier from a transmitter node 10. The receiver node 12 and the transmitter node 10 are comprised in a radio communications network.

The receiver node 12 comprises a receiving circuit 1001 configured to receive a signal over a radio channel, which signal has been transmitted in a time structured transmission comprising time slots of a specific length in time. The signal is carrying a first reference symbol and a second reference symbol transmitted in a first time slot and an adjacent second time slot, respectively. The receiver node 12 further comprises an estimating circuit 1002 configured to estimate a first channel estimate of the received first reference symbol and a second channel estimate of the received second reference symbol. In addition, the receiver node comprises a determining circuit 1003 configured to determine a first frequency offset estimate based on the first channel estimate and the second channel estimate. The determining circuit 1003 is further configured to determine a second frequency offset estimate by adding or subtracting a frequency value to the first frequency offset estimate. The second frequency offset estimate may be referred to as a mirrored frequency offset estimate. The frequency value may be set to a value in a range of 1800-2100 Hz or −1800–−2100 Hz.

Furthermore, the receiver node 12 comprises an extracting circuit 1004 configured to extract at least one reference symbol of the first and second reference symbols of the received signal. The receiver node 12 also comprises a frequency compensating circuit 1005 configured to frequency compensate the extracted at least one reference symbol using the first frequency offset estimate resulting in a first compensated reference symbol. The frequency compensating circuit 1005 is further configured to frequency compensate the extracted at least one reference symbol using the second frequency offset estimate resulting in a second compensated reference symbol.

Also, the receiver node 12 comprises a correlating circuit 1006 configured to correlate each of the respective first and second compensated reference symbols with a target reference symbol. The receiver node 12 comprises a selecting circuit 1007 configured to select the frequency offset estimate, out of the first frequency offset estimate and the second frequency offset estimate, giving a largest level of correlation between the corresponding first or second compensated reference symbol and the target reference symbol. Additionally, the receiver node 12 comprises a compensating circuit 1008 configured to compensate the frequency offset of the received data symbol by using the selected frequency offset estimate.

The present mechanism for enabling frequency offset compensation in the receiving node 12 in the radio communications network may be implemented through one or more processors, such as a processing circuit 1009 in the receiver node 12 depicted in FIG. 10, together with computer program code for performing the functions of the present solution. The program code mentioned above may also be provided as a computer program product, for instance in the form of a data carrier carrying computer program code for performing the present solution when being loaded into the receiver node 12. One such carrier may be in the form of a CD ROM disc. It is however feasible with other data carriers such as a memory stick. The computer program code may furthermore be provided as pure program code on a server and downloaded to the receiver node 12.

The determining circuit 1003 may be arranged to determine the first frequency offset estimate based on a covariance of the first and second channel estimate. Furthermore, the determining circuit 1003 may be arranged to determine the first frequency offset estimate by calculating an unwrapped frequency offset estimate. This may be performed by adding or subtracting an unwrap frequency value based on a difference between an initial frequency offset estimate and an average of previous first frequency offset estimates.

The determining circuit 1003 may also be arranged to determine the first frequency offset estimate by filtering an initial frequency offset estimate. This may be performed by averaging the initial frequency offset estimate with previous first frequency offset estimates into an averaged frequency offset estimate.

The determining circuit 1003 may furthermore be arranged to determine the first frequency offset estimate by adding or subtracting a wrap frequency value to the averaged frequency offset estimate if the averaged frequency offset estimate is outside a frequency offset threshold, which adding or subtracting may be referred to as wrapping. The frequency offset threshold may be set to a value in a range of 1600-2100 Hz or −1600-−2100 Hz. The wrap frequency value and the unwrap frequency value are in a corresponding range.

The receiver node 12 may further comprise a transforming circuit 1010 arranged to transform the respective first and second compensated reference symbols in a Fast Fourier Transform process before correlating the respective first and second compensated reference symbol with the target reference symbol in the correlating circuit 1006.

Furthermore, the receiver node 12 may comprise an averaging circuit 1011 arranged to average respective first and second compensated reference symbols before selecting the frequency offset estimate out of the first and second frequency offset estimates in the selecting circuit 1007.

In some embodiments, the signal is received over a Random Access Channel mapped onto a Physical Random Access Channel and the first determined frequency offset estimate or the initial frequency offset estimate is based on the signal on the random access channel. The determined first frequency offset estimate is then given a larger weight than the second frequency offset estimate when selecting the frequency offset estimate out of the first and second frequency offset estimates in the selecting circuit 1007.

It should here be mentioned that the receiver node 12 may be represented by a radio base station 10 also referred to as e.g. a NodeB, an evolved Node B (eNB, eNode B), a base transceiver station, Access Point Base Station, base station router, or any other network unit capable to communicate with a user equipment within a cell served by the radio base station 12, depending e.g. of the radio access technology and terminology used. The transmitter node 10 may be represented by a user equipment e.g. a wireless communication terminal, a mobile cellular phone, a Personal Digital Assistant (PDA), a wireless platform, a laptop, a computer or any other kind of device capable to communicate wirelessly with the receiver 12. Also, the receiver node 12 may be represented by user equipment and the transmitter node 10 may be represented by a radio base station.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method, in a receiver node, for compensating a frequency offset of a received data symbol in a signal on an orthogonal frequency division (OFDM) multiplexed carrier from a transmitter node, the receiver node and the transmitter being in a radio communications network, the method comprising:
receiving the signal over a radio channel, the signal transmitted in a time structured transmission comprising time slots of a specific length in time, the signal carrying a first reference symbol and a second reference symbol transmitted in a first time slot and an adjacent second time slot, respectively;
estimating a first channel estimate of the received first reference symbol;
estimating a second channel estimate of the received second reference symbol;
determining a first frequency offset estimate based on the first channel estimate and the second channel estimate;
determining a second frequency offset estimate by adding or subtracting a frequency value to the first frequency offset estimate;
extracting at least one reference symbol of the first and second reference symbols from the received signal;
frequency compensating the extracted at least one reference symbol using the first frequency offset estimate resulting in a first compensated reference symbol;
frequency compensating the extracted at least one reference symbol using the second frequency offset estimate resulting in a second compensated reference symbol;
correlating each of the first and second compensated reference symbols with a target reference symbol;
selecting the first or second frequency offset estimate having a largest level of correlation between the corresponding first or second compensated reference symbol and the target reference symbol as a selected frequency offset estimate; and
compensating the frequency offset of the received data symbol by using the selected frequency offset estimate.

2. The method of claim 1, wherein the determining the first frequency offset estimate comprises determining the first frequency offset based on a covariance of the first and second channel estimates.

3. The method of claim 2, wherein the determining the first frequency offset estimate comprises calculating an unwrapped frequency offset estimate by adding or subtracting an unwrap frequency value based on a difference between an initial frequency offset estimate and an average of previous first frequency offset estimates.

4. The method of claim 1, wherein the frequency value for determining the second frequency offset estimate is set to a value in a range of 1800 Hz to 2100 Hz, or −1800 Hz to −2100 Hz.

5. The method of claim 1, further comprising, prior to the correlating the first and second compensated reference symbols with the target reference symbol, transforming the first and second compensated reference symbols in a Fast Fourier Transform process.

6. The method of claim 1, further comprising, prior to the selecting the selected frequency offset estimate, averaging the first and second compensated reference symbols, respectively.

7. The method of claim 1:
wherein the signal is received over a Random Access Channel mapped onto a Physical Random Access Channel;
wherein the determined first frequency offset estimate is based on the signal on the Random Access Channel and given a larger weight than the second frequency offset estimate when selecting the selected frequency offset estimate out of the first and second frequency offset estimates.

8. The method of claim 3, wherein the determining the first frequency offset estimate comprises filtering the unwrapped frequency offset estimate by averaging the unwrapped frequency offset estimate with previous first frequency offset estimates into an averaged frequency offset estimate.

9. The method of claim 8, wherein the determining the first frequency offset estimate comprises adding or subtracting a wrap frequency value to the averaged frequency offset estimate if the averaged frequency offset estimate is outside a frequency offset threshold.

10. The method of claim 9:
wherein the frequency offset threshold is set to a value in a range of 1600 Hz to 2100 Hz, or −1600 Hz to −2100 Hz;

wherein the wrap frequency value and the unwrap frequency value are in a corresponding range.

11. A receiver node for compensating a frequency offset of a received data symbol in a signal on an orthogonal frequency division (OFDM) multiplexed carrier from a transmitter node, wherein the receiver node and the transmitter node are in a radio communications network, the receiver node comprising:
- a receiving circuit configured to receive the signal over a radio channel, the signal transmitted in a time structured transmission comprising time slots of a specific length in time, the signal carrying a first reference symbol and a second reference symbol transmitted in a first time slot and an adjacent second time slot, respectively;
- an estimating circuit configured to estimate:
    - a first channel estimate of the received first reference symbol; and
    - a second channel estimate of the received second reference symbol;
- a determining circuit configured to determine:
    - a first frequency offset estimate based on the first channel estimate and the second channel estimate; and
    - a second frequency offset estimate by adding or subtracting a frequency value to the first frequency offset estimate;
- an extracting circuit configured to extract at least one reference symbol of the first and second reference symbols from the received signal;
- a frequency compensating circuit configured to:
    - frequency compensate the extracted at least one reference symbol using the first frequency offset estimate resulting in a first compensated reference symbol; and
    - frequency compensate the extracted at least one reference symbol using the second frequency offset estimate resulting in a second compensated reference symbol;
- a correlating circuit configured to correlate each of the first and second compensated reference symbols with a target reference symbol;
- a selecting circuit configured to select the first or second frequency offset estimate having a largest level of correlation between the corresponding first or second compensated reference symbol and the target reference symbol as a selected frequency offset estimate; and
- a compensating circuit configured to compensate the frequency offset of the received data symbol by using the selected frequency offset estimate.

* * * * *